Sept. 22, 1959   C. H. PHELPS   2,905,890
SURFACE SPEED INDICATOR
Filed May 17, 1956
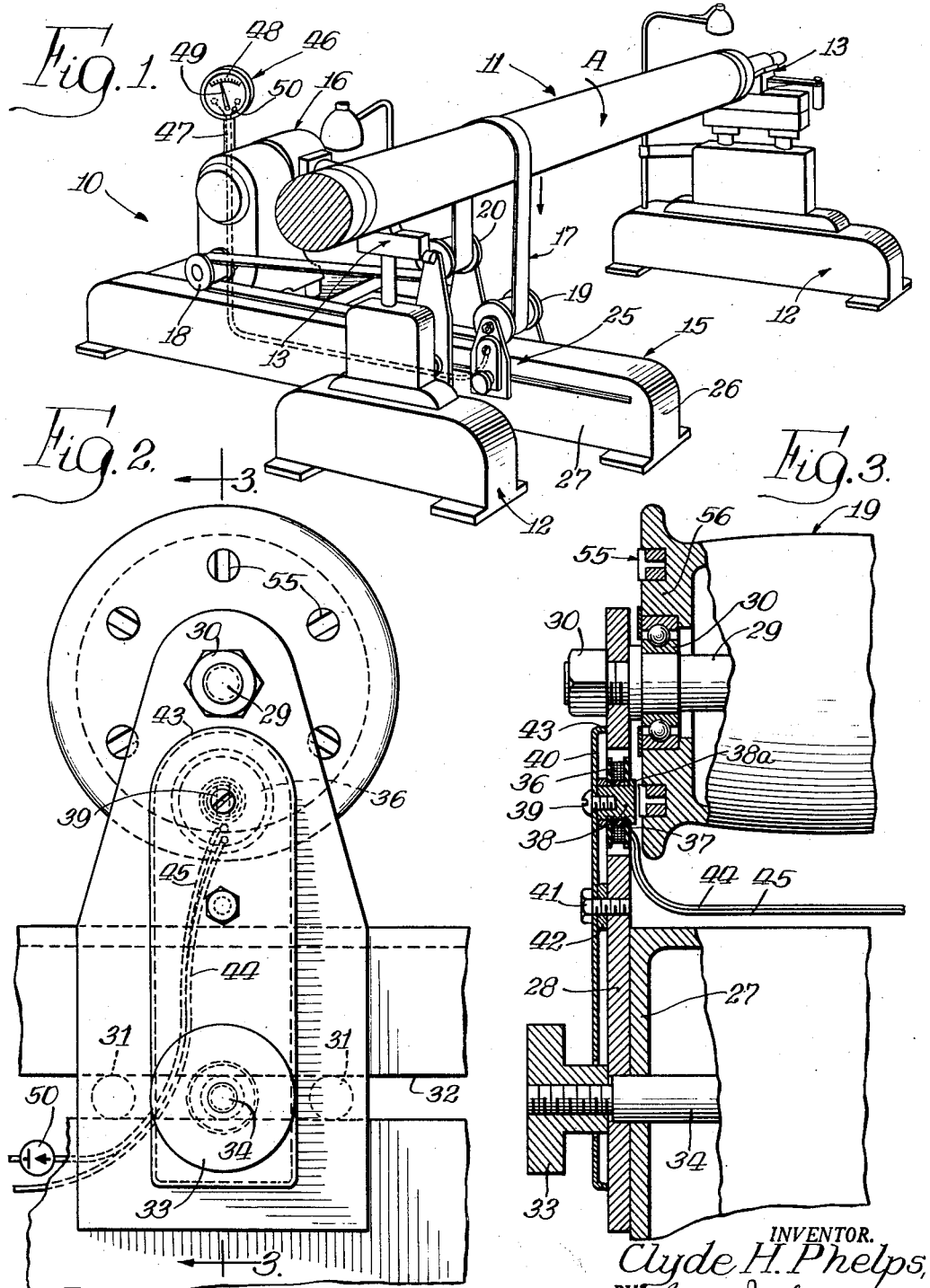
INVENTOR.
Clyde H. Phelps, United States Patent Office 2,905,890
Patented Sept. 22, 1959

2,905,890

SURFACE SPEED INDICATOR

Clyde H. Phelps, Springfield, Ill., assignor to Vincent J. Getzendanner, Springfield, Ill.

Application May 17, 1956, Serial No. 585,442

2 Claims. (Cl. 324—70)

The present invention relates to speed indicating means and apparatus, and more particularly, to apparatus for indicating the surface speed of rotating masses.

In the dynamic balancing of rolls or rotors, certain applications require the balancing of such rotors in relation to a preselected surface speed rather than by revolutions per minute. A typical instance of such requirement occurs in the large rolling mills used in the paper making industry wherein multiple rolls of various diameters are necessarily driven at like constant surface speed with paper being fed therethrough in a continuous web or belt. Similar occurrence is found in the web-type printing presses used in newspaper printing. Because of the many diameters of the rollers involved, the revolutions per minute correspondingly are varied, but the surface speed of such rollers is maintained at a constant. Such rollers or rotors are dynamically balanced and corrected to prevent excess central deflection or whip at a surface speed corresponding with actual mill operation. Normally, such rotors are constructed as non-rigid members, oftentimes having great weight even to several tons while others are of light tubular construction. In all cases, however, the rollers are relatively long as compared to their diameter. Most paper mill rollers, for example, are 15 to 25 feet in length with diameters ranging from 6 inches to 6 feet.

Because such rotors are of the non-rigid type, balance at one speed does not necessarily produce balance at all speeds. In particular, the rollers are subject to marked deflection or whip, which is a variable and can be corrected therefore for only one required operational speed; that surface speed at which all the rollers used in the entire rolling mill operate. Such rollers are often very badly unbalanced and must be run at very slow speeds until partial balance has been obtained after which the speed can be increased slowly until excessive deflection or whip develops. This deflection or whip caused by unbalance, must then be corrected so that the roller may be run up to the desired operational surface speed at which the final corrected balancing is undertaken. Normally, this speed is approximate to the speed at which the natural frequency of the mass causes a critical deflection.

It is therefore essential that a reliable means be provided for measuring the surface speed of the rotors and to be operative irrespective of the diameter of the particular rotors encountered. From both the standpoint of safety of operation as well as obtaining a desired accurate result, the measuring device must be independent or free from whip at the desired operational surface speed of the rotating mass or rotor. While there are many speed indicator systems presently known in the art, hand held tachometers and the like are normally designed to be operated by running or engaging contact with the surface of the rotor. Obviously, if the roller or rotor is whipping badly at the desired end operating speed therefor, a tachometer is not capable of making an accurate reading nor is the time available for making such a reading. The shortness of time interval at the critical or whipping speed arises because the instant that the roller whips or deflects, the operator notes such speed and immediately slows the roller to prevent permanent damage or deflection thereof; the whip being a function of rotational speed.

The present invention provides an automatic means for indicating surface speed of any diameter rotor, such being particularly useful in combination with balance and whip testing machinery. The indicating means of this invention is capable of such automatic indication while the rotor is running in the balance testing machine and such provides continuous substantially instantaneous indications as the speed of the rotor is changed or varied. My new indicator is also free of actual physical contact with the rotor under test.

Briefly, the indicating means of the present invention involves electromagnetic means mounted without physical contact with the rotor under test whereby the speed indications of such indicator are free of the vibrational and whipping activities of the unbalanced mass. Normally, balance testing machines for effecting the dynamic balancing operation of elongated rollers, comprise a motor-driven belt trained over the rotor for driving or imparting rotational motion to the latter; such rotor being mounted in suitable bearings free to move in a restricted plane of permissible vibratory motion. Such belt means is also normally trained over a suitable system of pulleys in its circuit from the source of driving power to and around the rotating mass.

I have found it very convenient and useful to employ one of such pulley members, over which the driving belt is trained in driving the roller under test, as a support means for either a plurality or a single permanent magnet rotatable with such pulley wheel. The pulley wheel so chosen is normally an idler pulley disposed on the tension side of the belt and located between the rotating mass and the drive motor in the drive belt circuit. Such idler pulley functions at substantially the same surface speed as the rotor under test, the same being driven commonly therewith by the drive belt means. Cooperating with the magnets on the revolving pulley wheel and in close proximity thereto is a coil of conducting wire formed in a pancake style to provide an electrical generating means which, when electrically connected through suitable rectifier means to a D.C. electrical meter or connected directly to a suitable alternating current meter, can be calibrated to indicate directly surface speed in terms of feet/minute by reason of the voltage generated being a function of the movement of the magnet carried by the selected pulley wheel. Since one or more magnets may be provided on the rotating pulley element, each magnet as it passes the fixed coil element will produce a voltage pulse. Accordingly, indicating means not dependent upon voltage change produced by the change in speed of the rotating mass may be used for indication as well; such being, for example, a frequency meter of the electronic type well known in the art.

This indicating means so used in conjunction with a balance testing apparatus provides a simple, inexpensive and reliable indication of surface speed for the rotating mass. Further, such indicator is self-powered by reason of the magnet and coil combination and is substantially instantaneous and automatic in its reading or indication. The positioning of the magnets in the idler pulley on the tight or tension side of the drive belt provides a substantially exact duplicate of the surface speed of the rotor under test as there is no power drive of this pulley and no resistance to rotation except bearing friction and inertia, both of which factors ar negligible quantities. Further, since there is no physical engagement between the speed indicating means and the rotor under test, fine balancing operations can be accomplished without effect from the speed indicating system; such being in continuous operation during the rotational driving of the rotor.

The main object of this invention is to provide a new and improved speed indicating means for use in determining the surface speed of a rotating mass.

Another object of this invention is to provide a new and improved speed indicating apparatus for use with rotating masses, the same being freely independent of physical engagement with such mass.

Another object of this invention is to provide a new and improved surface speed indicating apparatus embodying electro-magnetic generating means such that the same is particularly useful in indicating the surface speed of elongated rotating masses having a relatively large ratio of length to diameter.

Still another object of this invention is to provide a new and improved surface speed indicator for use in indicating the surface speed of rotating masses, that which has no physical contact with such mass and which embodies a self-generating means for instantaneously and automatically indicating a surface speed cotemporaneous with the revolutions of the mass.

The above and further objects, features and advantages of this invention will be apparent to those familiar with the art from the following detailed description and specification of a preferred embodiment thereof illustrated in the accompanying drawings.

In the drawings:

Figure 1 is a perspective showing of a typical balancing machine for dynamically balancing an elongated rotating mass or rotor shown therein and with which the indicating means of this invention finds particular utility;

Figure 2 is an enlarged partial front elevational view of the indicating mechanism of my invention illustrated in Figure 1; and Figure 3 is a partial cross-sectional view taken substantially along line 3—3 of Figure 2 and looking in the direction of the arrows thereon.

As shown in Figure 1, a typical dynamic balancing machine, indicated generally by numeral 10, is employed for balancing elongated rotors such as the roller of a paper making mill shown at 11. The machine 10 includes a pair of bearing pedestal members 12—12 which carry suitable floating support means 13—13 in which the outer ends of the rotor 11 are rotatably supported for free lateral movement in a single horizontal plane. A drive pedestal 15 is also included, such being normally disposed intermediate or between the two bearing pedestals 12—12 and including a drive motor unit 16 for driving an endless belt means 17 trained over a driving pulley 18, a first idler pulley 19, a second idler pulley 20 and the rotating mass or rotor 11. It will be noted, in particular, that the rotor 11 is engaged by belt means 17 between the two idler pulleys 19 and 20; pulley 19 being on the tension side of the belt. With respect to this latter feature since the belt 17 is tensioned around pulley 19 (the direction of rotation for rotor 11 being as indicated by arrow A in Figure 1) and since pulley 19 is an idler or undriven except by belt contact, such pulley moves with and at the speed of movement for belt 17. Since belt 17 therefore commonly drives or rotates both the idler pulley 19 and the rotor 11, the surface speed of the belt, idler pulley 19 and rotor are substantially identical. Conversely, the idler pulley 20, on the slack side of the belt, or that is, in the upper run thereof as viewed in Figure 1, is subject to slippage, therefore failing to produce a positive co-current surface movement equal with the passage of the drive belt 17 therepast.

Mounted in conjunction and cooperation with idler pulley 19 is a new and improved indicator system 25 of this invention as will now be described.

In greater particular, it will be noted that the drive pedestal 15 includes a suitable supporting base 26 presenting a vertical side wall 27 to which a vertical mounting plate member 28 is attachable. Mounting plate 28 comprises at its upper end a bearing or support bracket for the pulley 19; the same being coupled to the central shaft 29 of the latter by means of a holding nut 30, as best shown in Figures 2 and 3. Shaft 29 which is stationary and about which the pulley member 19 rotates, is provided with sets of ball bearings 30 for rotatably supporting the pulley member 19 thereon. The plate 28 is provided with a set of laterally spaced positioning pins 31—31 receivable in an elongated slot 32 extending substantially lengthwise of the side wall 27 on the support base 26. A bracket retaining nut 33 threadingly cooperates with a holding bolt 34 passing through the side wall 27 and bracket plate 28 for holding the latter in desired positions of adjustment along the length of the support base 26.

Mounted in the bracket plate 28 is a pancake coil 36 comprising a continuous coil of electrically conductive wire wound about a usual core support 37 of insulating material. Core 37 is centrally held by a retaining bolt means 38 passing through plate 28; such core bolt 38 having a flanged inner end 38a and being fixed as by screw means 39 to a cover member 40 disposed outwardly of plate 28 and held to the latter by a central bolt means 41. A spacer washer 42 is provided around bolt 41 between the cover plate 40 and the mounting plate 28 to produce a desired spacing between such two members; such washer cooperating with a downwardly turned peripheral lip portion 43 of the cover plate in this spacing.

The wire coil 36 is provided with electrical leads 44 and 45 which are in electrical circuit with a meter means 46 supported at the upper end of a tubular column 47 mounted on the drive pedestal 15. Such meter bears a scale 48 which is preferably calibrated in terms of feet per minute and cooperates with a needle pointer 49 thereof for producing a direct reading of surface speed.

The meter 46 may comprise a conventional D.C. volt meter, in which event one of the leads, as for example, lead 44 will be in circuit with a conventional diode rectifier 50 so that direct current electrical impulses generated through leads 44 and 45, in a manner to be hereinafter set forth, will be fed to the meter. If desired, meter 46 can also comprise a conventional alternating current meter calibrated to indicate directly in terms of surface speed or feet per minute and in which event, the rectifier means 50 will not be employed and pulsating current imposed in conductors 44 and 45 will feed directly to the meter means.

As will be gained from the foregoing, it is obvious that the functioning of the meter means is dependent on the imposition of pulsating electromotive force in conductors 44 and 45. This is accomplished, according to the concept of my present invention, in a simple and direct manner by providing at least one permanent magnet 55 in end wall 56 of the pulley member 19. As shown in the particular embodiment illustrated, six such permanent magnets 55 are employed, each one of which passes adjacent the permanent coil member 36 to generate a voltage pulse. Since the pulley 19 is rotated in direct response and according to the surface speed of the rotator 11 and belt 17, the voltage pulses thus imposed on meter 46 will be directly proportional to the rotational speed of idler pulley 19. If instead of voltage change, which fluctuates with speed of operation of the magnetic generator comprising the coil 36 and the magnet member 55 carried by the idler pulley, it is desired to indicate frequency at which such impulses are applied to the conductors 44 and 45, then meter 46 can constitute a normal frequency meter of the electronic type well known in the art.

In any event, whether the meter be a D.C. voltage meter requiring the use of the rectifier means 50, an A.C. voltage meter or a frequency meter, the reading on scale 48 thereof will be in direct and instantaneous response to the generating impulses produced by the magnetic generator means described. It will thus be understood that I have herein set forth the features and concepts of an improved means for indicating surface speed of a rotating mass without resorting to means physically engageable with such mass such as a normal hand held tachometer or the like. This development is particularly important, as explained, in situations where the length of the rotating body is proportionately extreme with respect to its diameter such as elongated paper mill rolls which are subject to whip at a natural rotational frequency for the mass. This particular type of speed indicating mechanism is especially useful in determining the critical speed of a rotating mass such as a paper mill roller or that is, the speed at which the natural frequency of the roller causes the same to whip or reflect due to unbalance so that the roller may be balanced dynamically for a given preselected speed of operation irregardless of its diameter. This latter feature has marked importance in rolling mill operations, for example, in which the several rolls of the mill must operate with like surface speed.

It will further be recognized while I have herein described and shown my improved speed indicating means in association with a particular use and embodiment, that nevertheless the same is subject to modification, change and substitution of equivalents without necessarily departing from the spirit and scope of its inventive aspects. As a consequence, it is not my intention to be limited to the particular form of the device herein shown and described, except as may appear in the following appended claims.

I claim:

1. Apparatus for use with a balancing machine to indicate the surface speed of an unbalanced rotating mass comprising, a drive motor, a rotatable idler pulley, endless flexible belt means driven by said motor and trained in frictional driving engagement over the surface of the mass and said idler pulley such that the latter and said mass are cotemporaneously driven at like surface speeds, magnet means carried by said pulley substantially parallel to the rotational axis of the latter with a polar end of the magnet being available at one end of the pulley, electrical conductor coil means fixed stationarily adjacent said pulley's one end to cut through the field of magnetic flux produced by said magnet as the latter is moved past said conductor coil with the rotation of said pulley, and electrical volt meter means in circuit with said conductor coil to measure electrical impulses generated by the interpassage of said conductor through the field of said magnet, the value of such impulses being directly proportional and responsive to the surface speed of the mass.

2. In combination, a balancing machine including floating support members for mounting a mass to be balanced such that the mass is rotatable about an axis free to move in a horizontal plane, a drive motor having driving connection with drive pulley means, endless flexible belt means trained about said drive pulley means and the exterior surface of the mass to rotatably drive the latter, idler pulley means rotatably driven by and engaging said belt means on the tension side of the latter whereby the same moves with and at the speed of said belt and said mass, magnetic generator means operated by and with the rotation of said idler pulley means, and electrical meter means in circuit with said generator means for measuring electrical impulses produced thereby, the value of such impulses being directly responsive to the rotation of said idler pulley means and therefore a direct measurement of the surface speed of said mass.

References Cited in the file of this patent

UNITED STATES PATENTS

| | | |
|---|---|---|
| 1,709,674 | Kuhl | Apr. 16, 1929 |
| 1,846,678 | Ferrell | Feb. 23, 1932 |
| 2,332,773 | Barnette | Oct. 26, 1943 |
| 2,559,849 | Covert | July 10, 1951 |
| 2,768,315 | Okabe | Oct. 23, 1956 |